(12) United States Patent
Koker

(10) Patent No.: US 9,396,513 B2
(45) Date of Patent: Jul. 19, 2016

(54) USING GROUP PAGE FAULT DESCRIPTORS TO HANDLE CONTEXT SWITCHES AND PROCESS TERMINATIONS IN GRAPHICS PROCESSORS

(71) Applicant: Intel Corporation, Santa Clara, CA (US)

(72) Inventor: Altug Koker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/958,824

(22) Filed: Aug. 5, 2013

(65) Prior Publication Data

US 2015/0035840 A1   Feb. 5, 2015

(51) Int. Cl.
| | | |
|---|---|---|
| G06F 12/00 | (2006.01) | |
| G06T 1/20 | (2006.01) | |
| G06F 9/38 | (2006.01) | |
| G06F 13/00 | (2006.01) | |
| G06F 13/28 | (2006.01) | |
| G06T 1/60 | (2006.01) | |
| G06F 11/07 | (2006.01) | |

(52) U.S. Cl.
CPC ... *G06T 1/20* (2013.01); *G06F 9/38* (2013.01); *G06F 11/073* (2013.01); *G06T 1/60* (2013.01)

(58) Field of Classification Search
CPC ............................... G06F 11/073; G06T 1/60
USPC .......................................................... 711/206
See application file for complete search history.

(56) References Cited

U.S. PATENT DOCUMENTS

| | | | | |
|---|---|---|---|---|
| 6,684,305 | B1 * | 1/2004 | Deneau | 711/159 |
| 7,916,146 | B1 * | 3/2011 | Keller et al. | 345/506 |
| 2012/0147021 | A1 * | 6/2012 | Cheng et al. | 345/522 |
| 2012/0194524 | A1 * | 8/2012 | Hartog et al. | 345/501 |
| 2014/0267323 | A1 * | 9/2014 | Koker et al. | 345/520 |

* cited by examiner

*Primary Examiner* — Mark Giardino, Jr.
(74) *Attorney, Agent, or Firm* — Jordan IP Law, LLC

(57) ABSTRACT

Methods and systems may provide for detecting an end of execution of a process on a graphics processor and providing a group page fault descriptor to a page miss handler of an operating system (OS) in response to the end of execution of the process, wherein the group page fault descriptor may indicate to the page miss handler that no further page fault requests will be generated by the graphics processor until one or more outstanding page fault requests are satisfied. Additionally, a response to the group page fault descriptor may be received from the page miss handler. In one example, a process identifier is incorporated into the group page fault descriptor, wherein the process identifier is shared by the group page fault descriptor and the one or more outstanding page fault requests.

24 Claims, 5 Drawing Sheets

USING GROUP PAGE FAULT DESCRIPTORS TO HANDLE CONTEXT SWITCHES AND PROCESS TERMINATIONS IN GRAPHICS PROCESSORS

BACKGROUND

In traditional computing systems, page faults and/or misses may occur when software accesses a fixed-length contiguous block of memory (e.g., a page) that is mapped in virtual memory space but is not loaded into physical memory. More recent computing systems may include a graphics processing unit (GPU) that experiences page faults when accessing addresses in virtual memory space. In such a configuration, hardware of the GPU may report each page fault to an operating system (OS) running on a central processing unit (CPU) of the system. As the OS resolves the page faults, page fault responses may then be communicated from the OS back to the GPU. If, however, either the GPU decides to switch contexts from an existing process to a different process or an existing process encounters a termination condition, new process contexts and recycled processes, respectively, may be negatively impacted. For example, outstanding page faults that are satisfied after a context switch or process termination may lead to incorrect scheduling decisions and/or system instability. Indeed, this instability may increase as the frequency of context switches and processes terminations increases, because tracking outstanding page faults on GPU hardware may be complex and difficult to implement under conventional solutions.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
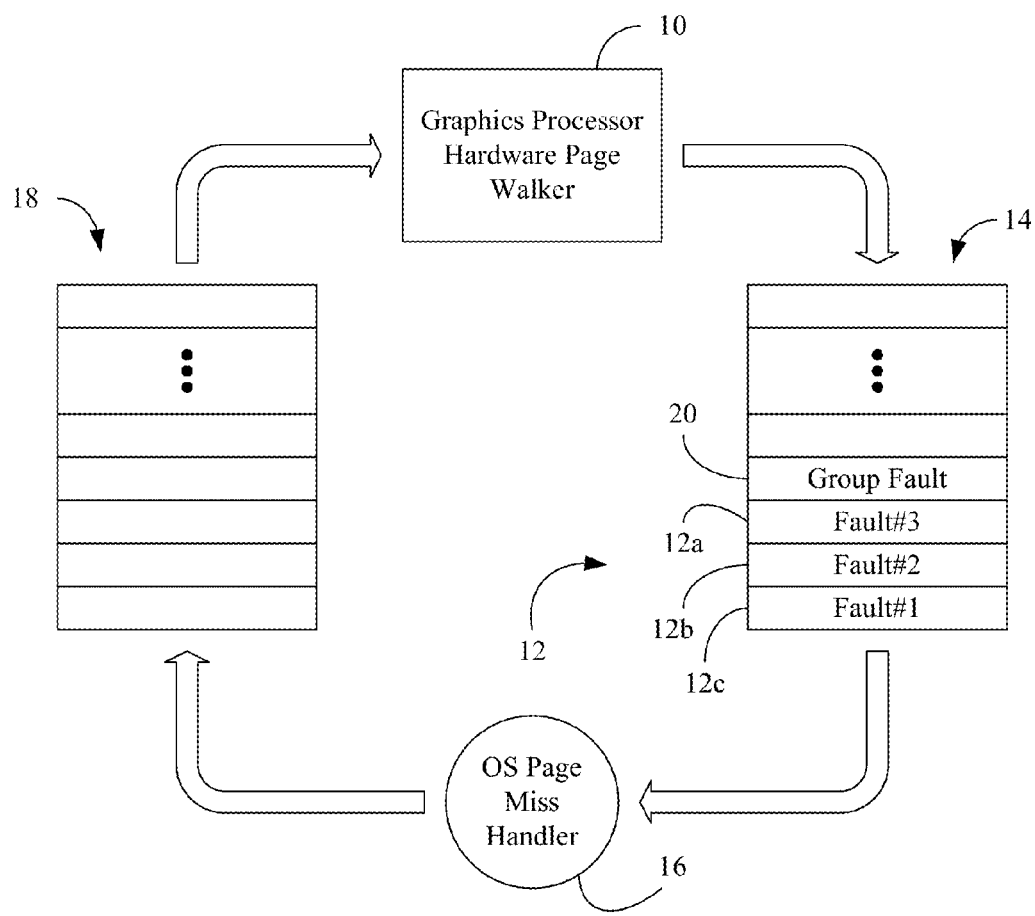
FIG. 1 is a block diagram of an example of an approach in which group page fault descriptors are used to handle context switches and process terminations in accordance with an embodiment.

FIG. 1 shows an approach in which group fault descriptors are used to handle context switches and process terminations in a graphics processor. In the illustrated example, a hardware page walker 10 of a graphics processor detects page misses in conjunction with the operation of a graphics-related process such as, for example, a fixed functionality process that supports a video and/or gaming application and uses virtualized memory space to visually present content associated with the application. As the page misses are detected, the hardware page walker 10 may place corresponding page fault requests 12 (12a-12c) into a page request queue 14, which may be accessed by a page miss handler 16 of an operating system (OS). As the OS resolves the page faults, the page miss handler 16 may generally place responses in a page response queue 18, which may be accessed by the hardware page walker 10.

An end of execution of the process may be detected by receiving a process termination notification from the OS, receiving a context switch notification from a graphics driver and/or hardware scheduler, and so forth. If the hardware page walker 10 detects an end of execution of the process on the graphics processor, a group page fault descriptor 20 may be placed into the page request queue 14, wherein the group page fault descriptor 20 indicates to the page miss handler 16 that no further page fault requests will be generated until one or more outstanding page fault requests such as, for example, the page fault requests 12, are satisfied.

Since the illustrated group page fault descriptor 20 does not correspond to a particular page fault, the hardware page walker 10 may determine the address of the last memory access associated with the ending process and incorporate that address into the group page fault descriptor 20. Such an approach guarantees that the address is in the active process memory space and may prevent fatal handling of the process in question. Moreover, a process identifier (e.g., process address space identifier/PASID) may be incorporated into the group page fault descriptor 20, wherein the process identifier is shared by the group page fault descriptor 20 and one or more outstanding page fault requests such as the page fault requests 12. The illustrated group page fault descriptor 20 may therefore function as a marker in the page request queue 14 so that all previous page fault requests with the same process identifier may be cleared by the hardware page walker 10 when a response to the group page fault descriptor 20 is received.

Upon receiving the response to the group page fault descriptor 20, the hardware page walker may generate a notification of the end of execution of the process (e.g., in the case of a process termination) and/or mark an end of a context associated with the process (e.g., in the case of a context switch). As will be discussed in greater detail, using the response to the group page fault descriptor 20 to handle the end of a process may provide a clear boundary for both hardware and scheduling software to track the progress of faulted pages. As a result, the illustrated approach enables better performance, utilization and responsiveness for graphics-related processes.

Figure 2:
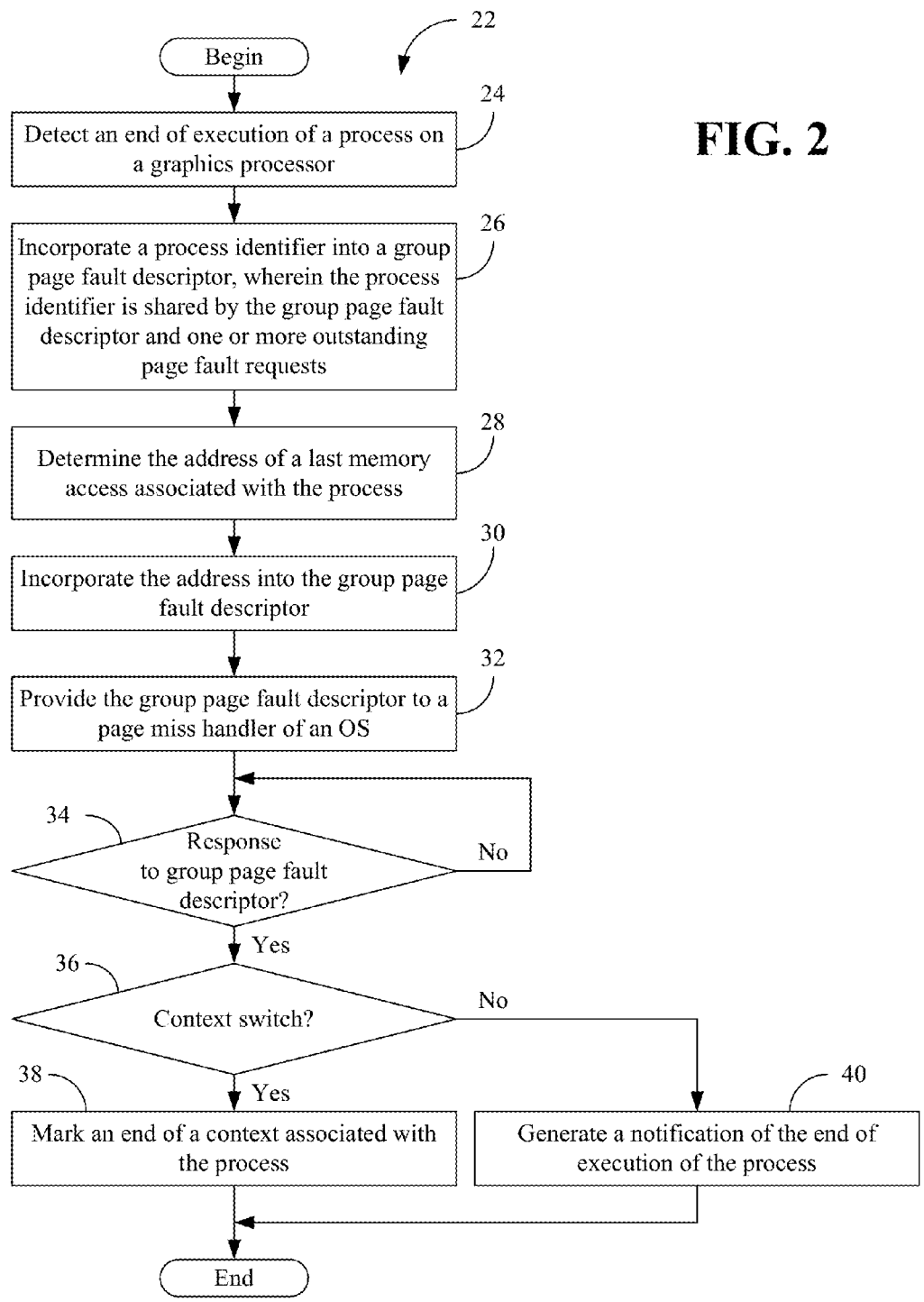
FIG. 2 is a block diagram of an example of a method of using group page fault descriptors to handle context switches and process terminations in accordance with an embodiment.

Turning now to FIG. 2, a method 22 of using group page fault descriptors to handle context switches and process terminations is shown. The method 22 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as Java, Smalltalk, C++ or the like and conventional procedural programming languages, such as the "C" programming language or similar programming languages.

Illustrated block 24 provides for detecting the end of execution of a process on a graphics processor. As already noted, detecting the end of execution of the process may include receiving a process termination notification from an OS, receiving a context switch notification from a graphics driver and/or hardware scheduler, and so forth. A process identifier may be incorporated into a group page fault descriptor at block 26, wherein the process identifier may be shared by the group page fault descriptor and one or more outstanding page fault requests. Block 28 may determine the address of a last memory access associated with the process, wherein the address may also be incorporated into the group page fault descriptor at block 30.

The group page fault descriptor may be provided to a page miss handler of an OS at block 32, wherein the group page fault descriptor indicates to the page miss handler that no further page requests will be generated until one or more outstanding page fault requests (e.g., outstanding page fault requests sharing the same process identifier) have been satisfied. A determination may be made at block 34 as to whether a response has been received to the group page fault descriptor from the page miss handler. If so, a determination may be made at block 36 as to whether a context switch has occurred. If a context switch has occurred, illustrated block 38 marks an end of a context associated with the process. Otherwise, a notification of the end of execution of the process may be generated at block 40. Thus, the process may be configured for another context (e.g., in the case of a context switch) or recycled (e.g., in the case of a process termination), without concern over system instability.

Of particular note is that illustrated block 34 waits until a response to the group page fault descriptor is received and does not track individual page fault responses. Such an approach may simplify operation of the hardware page walker and provide optimization opportunities (e.g., more efficient and reliable context switches and process terminations) while clearly isolating the boundary between the hardware and software components for communication. For example, when a process is due for termination, software may initiate the flow but may not have a clear indication of when hardware has been cleared of the process that is being terminated. While hardware is still working on removing the context of the process, it may still require software to respond to page faults even if responding means mapping non-existing pages to some "dummy" location. Use of a group page fault descriptor can mark the boundary where hardware has clearly completed all memory accesses pertaining to the process that is being terminated.

Figure 3:
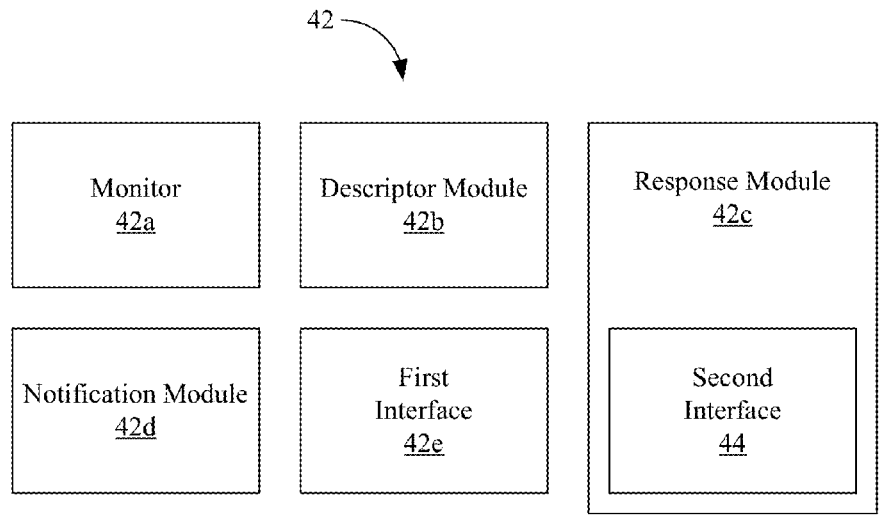
FIG. 3 is a logic architecture according to an embodiment.

FIG. 3 shows a logic architecture 42 (42a-42d) that may use group page fault descriptors to handle context switches and process terminations in a graphics processor. The architecture 42 may therefore implement one or more aspects of the hardware page walker 10 (FIG. 1) and/or the method 22 (FIG. 2), already discussed. In the illustrated example, a monitor 42a detects an end of execution of a process (e.g., video application, gaming application, etc., or portion thereof) on the graphics processor. Additionally, a descriptor module 42b may provide a group page fault descriptor to a page miss handler of an OS in response to the end of execution of the process, wherein the group page fault descriptor indicates to the page miss handler that no further page fault requests will be generated until one or more outstanding page fault requests are satisfied. The illustrated architecture 42 also includes a response module 42c that receives a response to the group page fault descriptor from the page miss handler.

As already noted, the descriptor module 42b may also incorporate a process identifier into the group page fault descriptor, wherein the process identifier is shared by the group page fault descriptor and the one or more outstanding page fault requests. Moreover, the descriptor module 42b may determine the address of the last memory access associated with the process, and incorporate the address into the group page fault descriptor.

In one example, the monitor 42a receives a process termination notification from the OS to detect the end of execution of the process and a notification module 42d generates a notification of the end of execution of the process based on the response to the group page fault descriptor. Additionally, the monitor 42a may receive a context switch notification from one or more of a graphics driver or a hardware scheduler to detect the end of execution of the process, wherein the notification module 42d may mark an end of a context associated with the process based on the response to the group page fault descriptor.

An input output memory management unit (IOMMU) may be used to communicate between the architecture 42 and the page miss handler. In such a case, the architecture 42 may include a first interface 42e to place the group page fault descriptor into a page request queue such as, for example, the page request queue 14 (FIG. 1) of the IOMMU to provide the group page fault descriptor to the page miss handler. In addition, the response module 42c may include a second interface 44 to retrieve the response to the group page fault descriptor from a page response queue such as, for example, the page response queue 18 (FIG. 1) of the IOMMU to receive the response from the page miss handler.

Figure 4:
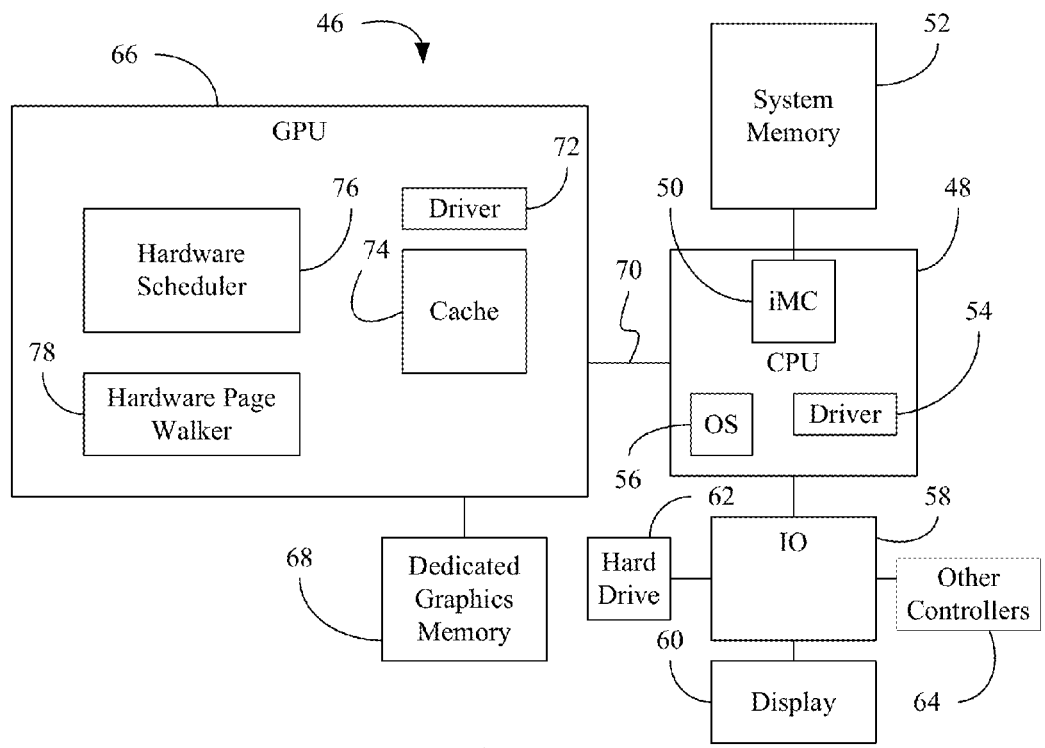
FIG. 4 is a block diagram of a system according to an embodiment.

Turning now to FIG. 4, a computing system 46 is shown, wherein the system 46 may be part of a mobile platform such as a laptop, mobile Internet device (MID), personal digital assistant (PDA), media player, imaging device, etc., any smart device such as a smart phone, smart tablet, smart TV (television) and so forth, or any combination thereof. The system 46 may also be part of a fixed platform such as a personal computer (PC), server, workstation, etc. The illustrated system 46 includes a central processing unit (CPU, e.g., host processor) 48 with an integrated memory controller (iMC) 50 that provides access to system memory 52, which could include, for example, double data rate (DDR) synchronous dynamic random access memory (SDRAM, e.g., DDR3 SDRAM JEDEC Standard JESD79-3C, April 2008) modules. The modules of the system memory 52 may be incorporated, for example, into a single inline memory module (SIMM), dual inline memory module (DIMM), small outline DIMM (SODIMM), and so on. In one example, the iMC 50 includes an IOMMU having a page request queue and a page response queue.

The CPU 48 may also have one or more drivers 54 and/or processor cores (not shown), where each core may be fully functional with instruction fetch units, instruction decoders, level one (L1) cache, execution units, and so on. The CPU 48 could alternatively communicate with an off-chip variation of the iMC 50, also known as a Northbridge, via a front side bus or a point-to-point fabric that interconnects each of the components in the system 46. The CPU 48 may also execute an operating system (OS) 56 having a page miss handler.

The illustrated CPU 48 communicates with an input/output (IO) module 58, also known as a Southbridge, via a bus. The iMC 50/CPU 48 and the IO module 58 are sometimes referred to as a chipset. The CPU 48 may also be operatively connected to a network (not shown) via a network port through the IO module 58 and various other controllers 64. Thus, the other controllers 64 could provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 58 may also communicate with a display 60 to provide for the visual output/presentation of video, images, and other content. The other controllers 64 could also communicate with the IO module 58 to provide support for user interface devices (not shown) such as a keypad, mouse, etc., in order to allow a user to interact with and perceive information from the system 46.

The IO module 58 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 58 is also coupled to storage, which may include a hard drive 62, read only memory (ROM), optical disk, flash memory (not shown), etc.

The illustrated system 46 also includes a dedicated graphics processing unit (GPU) 66 coupled to a dedicated graphics memory 68. The dedicated graphics memory 68 could include, for example, GDDR (graphics DDR) or DDR SDRAM modules, or any other memory technology suitable for supporting graphics rendering. The GPU 66 and graphics memory 68 might be installed on a graphics/video card, wherein the GPU 66 may communicate with the CPU 48 via a graphics bus 70 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 48 die, configured as a discrete card on the motherboard, etc. The GPU 66 may also execute one or more drivers 72, and may include a hardware scheduler 76, a hardware page walker 78 and an internal cache 74 to store instructions and other data.

As already discussed, the hardware page walker 78 may have a monitor to detect the end of execution of processes on the GPU 66 and a descriptor module to provide group page fault descriptors to the page miss handler of the OS 56 in response to the end of execution of the processes. The group page fault descriptors may indicate to the page miss handler that no further page fault requests will be generated by the GPU 66 until one or more outstanding page fault requests are satisfied. Additionally, the hardware page walker 78 may include a response module that receives responses to the group page fault descriptors from the page miss handler.

In one example, the descriptor module of the hardware page walker 78 incorporates process identifiers into the group page fault descriptors, wherein each process identifier is to be shared by a group page fault descriptor and one or more outstanding page fault requests. Additionally, the descriptor module may determine the address of the last memory access associated with the processes and incorporate the addresses into the group page fault descriptors.

Moreover, if the monitor of the hardware page walker 78 detects the end of execution of a given process by receiving a process termination notification from the OS 56, a notification module of the hardware page walker 78 may generate a notification of the end of execution of the process based on the response to the corresponding group page fault descriptor. In addition, if the monitor of the hardware page walker 78 detects the end of execution of a given process by receiving a context switch notification from the graphics driver 72 and/or the hardware scheduler 76, the notification module of the hardware page walker 78 may mark an end of a context associated with the process based on the response to the group page fault detector.

Figure 5:
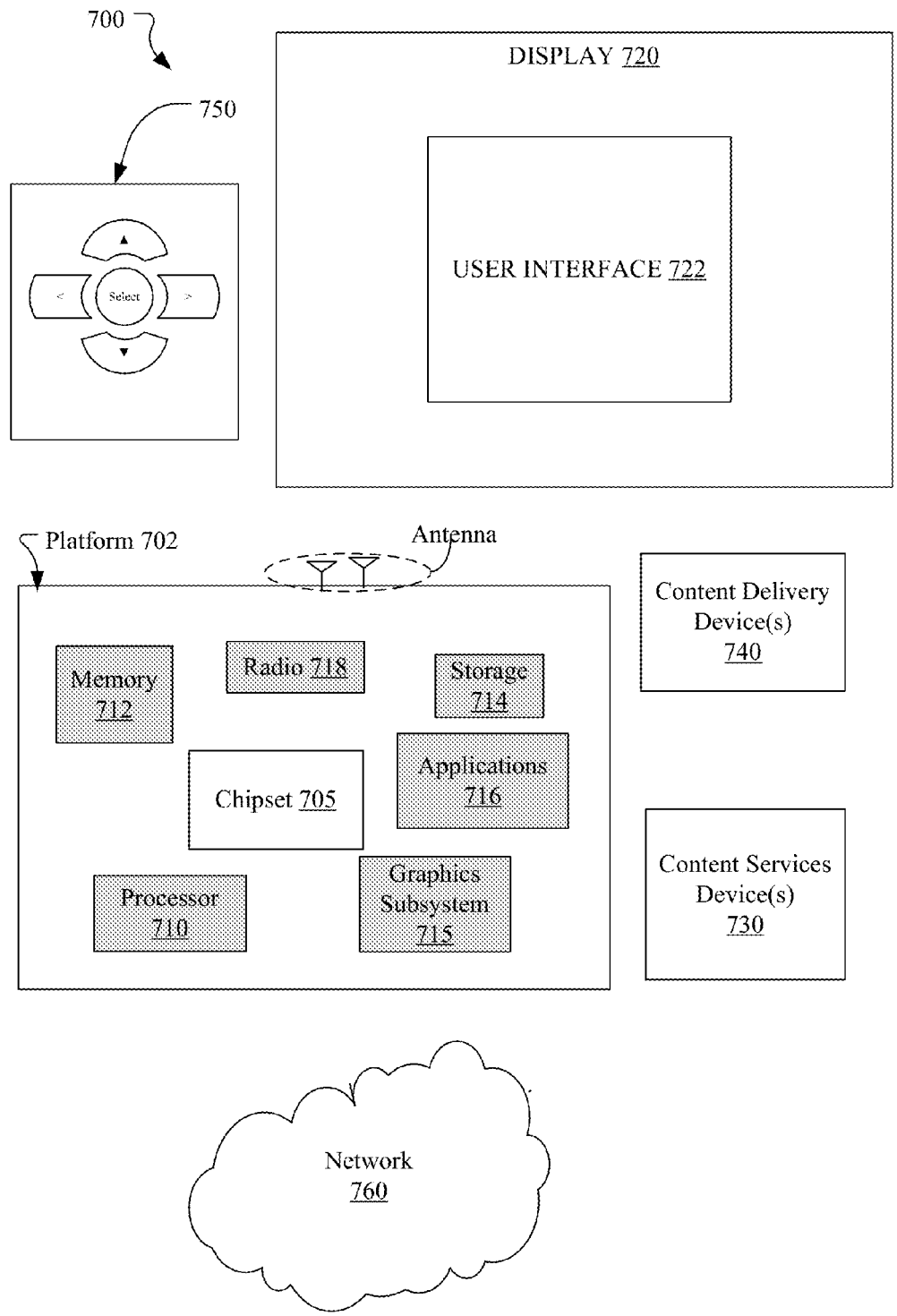
FIG. 5 is a block diagram of an example of a system having a navigation controller according to an embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to render images as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the GPU 66 (FIG. 4), already discussed. In addition, the processor 710 may be configured to operate as the CPU 48 (FIG. 4), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
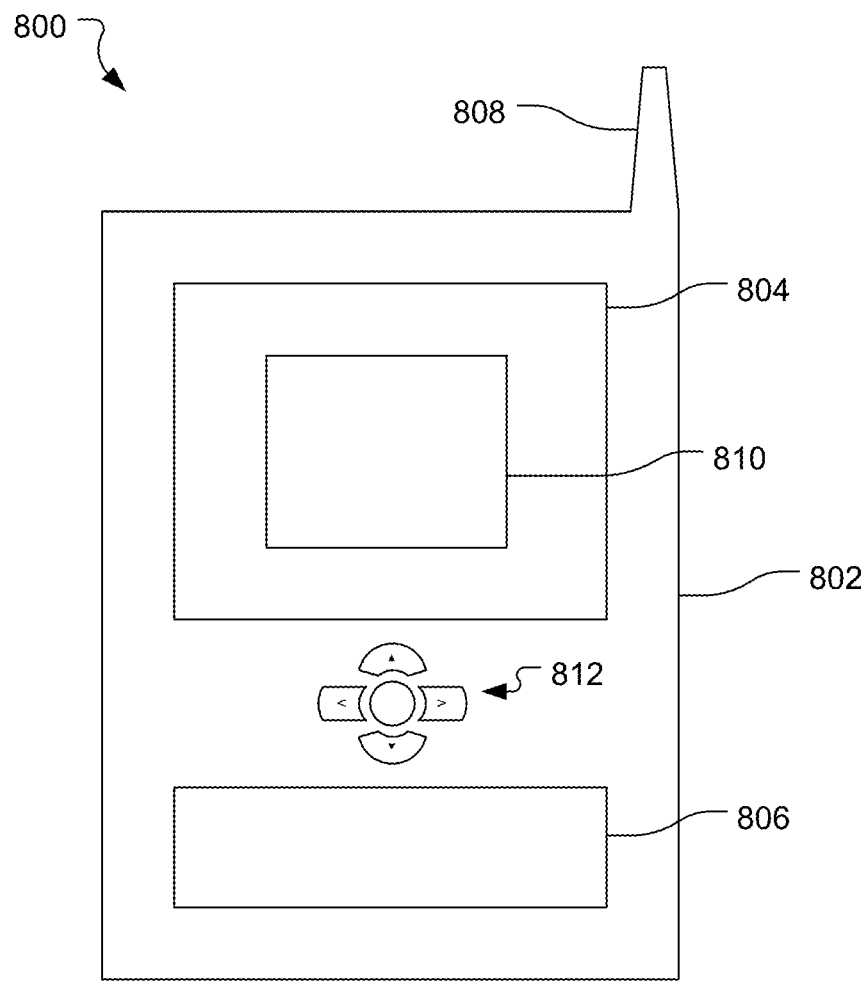
FIG. 6 is a block diagram of an example of a system having a small form factor according to an embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system comprising a display to visually present content associated with a process, a host processor to execute an operating system (OS) and a graphics processor. The graphics processor may include a monitor to detect an end of execution of the process on the graphics processor, a descriptor module to provide a group page fault descriptor to a page miss handler of the OS in response to the end of execution of the process, wherein the group page fault descriptor is to indicate to the page miss handler that no further page fault requests will be generated until one or more outstanding page fault requests are satisfied, and a response module to receive a response to the group page fault descriptor from the page miss handler.

Example 2 may include the system of Example 1, wherein the descriptor module is to incorporate a process identifier into the group page fault descriptor, and wherein the process identifier is to be shared by the group page fault descriptor and the one or more outstanding page fault requests.

Example 3 may include the system of Example 1, wherein the monitor is to receive a process termination notification from the OS to detect the end of execution of the process, the graphics processor further including a notification module to generate a notification of the end of execution of the process based on the response to the group page fault descriptor.

Example 4 may include the system of Example 1, wherein the monitor is to receive a context switch notification from one or more of a graphics driver or a hardware scheduler to detect the end of execution of the process, the graphics processor further including a notification module to mark an end of a context associated with the process based on the response to the group page fault descriptor.

Example 5 may include the system of Example 1, further including an input output memory management unit (IOMMU) having a page request queue and a page response queue, wherein the graphics processor further includes a first interface to place the group page fault descriptor into the page request queue to provide the group page fault descriptor to the page miss handler, and wherein the response module includes a second interface to retrieve the response from the page response queue to receive the response from the page miss handler.

Example 6 may include the system of any one of Examples 1 to 5, wherein the descriptor module is to determine an address of a last memory access associated with the process, and incorporate the address into the group page fault descriptor.

Example 7 may include an apparatus to manage page faults, comprising a monitor to detect an end of execution of a process on a graphics processor, a descriptor module to provide a group page fault descriptor to a page miss handler of an operating system (OS) in response to the end of execution of the process, wherein the group page fault descriptor is to indicate to the page miss handler that no further page fault requests will be generated until one or more outstanding page fault requests are satisfied, and a response module to receive a response to the group page fault descriptor from the page miss handler.

Example 8 may include the apparatus of Example 7, wherein the descriptor module is to incorporate a process identifier into the group page fault descriptor, and wherein the process identifier is to be shared by the group page fault descriptor and the one or more outstanding page fault requests.

Example 9 may include the apparatus of Example 7, wherein the monitor is to receive a process termination notification from the OS to detect the end of execution of the process, the apparatus further including a notification module to generate a notification of the end of execution of the process based on the response to the group page fault descriptor.

Example 10 may include the apparatus of Example 7, wherein the monitor is to receive a context switch notification from one or more of a graphics driver or a hardware scheduler to detect the end of execution of the process, the apparatus further including a notification module to mark an end of a context associated with the process based on the response to the group page fault descriptor.

Example 11 may include the apparatus of Example 7, further including a first interface to place the group page fault descriptor into a page request queue of an input output memory management unit (IOMMU) to provide the group page fault descriptor to the page miss handler, wherein the response module includes a second interface to retrieve the response from a page response queue of the IOMMU to receive the response from the page miss handler.

Example 12 may include the apparatus of any one of Examples 7 to 11, wherein the descriptor module is to determine an address of a last memory access associated with the process, and incorporate the address into the group page fault descriptor.

Example 13 may include a method of managing page faults, comprising detecting an end of execution of a process on a graphics processor, providing a group page fault descriptor to a page miss handler of an operating system (OS) in response to the end of execution of the process, wherein the group page fault descriptor indicates to the page miss handler that no further page fault requests will be generated until one or more outstanding page fault requests are satisfied, and receiving a response to the group page fault descriptor from the page miss handler.

Example 14 may include the method of Example 13, further including incorporating a process identifier into the group page fault descriptor, wherein the process identifier is shared by the group page fault descriptor and the one or more outstanding page fault requests.

Example 15 may include the method of Example 13, wherein detecting the end of execution of the process includes receiving a process termination notification from the OS, the method further including generating a notification of the end of execution of the process based on the response to the group page fault descriptor.

Example 16 may include the method of Example 13, wherein detecting the end of execution of the process includes receiving a context switch notification from one or more of a graphics driver or a hardware scheduler, the method further including marking an end of a context associated with the process based on the response to the group page fault descriptor.

Example 17 may include the method of Example 13, wherein providing the group page fault descriptor to the page miss handler includes placing the group page fault descriptor into a page request queue of an input output memory management unit (IOMMU) and receiving the response from the page miss handler includes retrieving the response from a page response queue of the IOMMU.

Example 18 may include the method of any one of Examples 13 to 17, further including determining an address of a last memory access associated with the process, and incorporating the address into the group page fault descriptor.

Example 19 may include at least one computer readable storage medium comprising a set of instructions which, if executed by a computing device, cause the computing device to perform the method of any one of Examples 13 to 18.

Example 20 may include an apparatus to manage page faults, comprising means for performing the method of any one of Examples 13 to 18.

Techniques described herein may therefore enable graphics processors to encounter process termination conditions and switch contexts from an existing process to a different process without experiencing system instability or tracking the satisfaction of individual page fault requests. Additionally, such an approach can enhance operation of graphics processors alongside host processors in conjunction with the same process while aspects of the process are managed via an OS running on the host processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A system comprising:
    a display to visually present content associated with a process;
    a host processor to execute an operating system (OS); and
    a graphics processor including,
        a monitor to detect an end of execution of the process on the graphics processor,
        a descriptor module to provide a group page fault descriptor to a page miss handler of the OS in response to a context switch, wherein the group page fault descriptor is to indicate to the page miss handler that no further page fault requests will be generated until one or more outstanding page fault requests are satisfied, and
        a response module to receive a response to the group page fault descriptor from the page miss handler.

2. The system of claim 1, wherein the descriptor module is to incorporate a process identifier into the group page fault descriptor, and wherein the process identifier is to be shared by the group page fault descriptor and the one or more outstanding page fault requests.

3. The system of claim 1, wherein the monitor is to receive a process termination notification from the OS to detect the end of execution of the process, the graphics processor further including a notification module to generate a notification of the end of execution of the process based on the response to the group page fault descriptor.

4. The system of claim 1, wherein the monitor is to receive a context switch notification from one or more of a graphics driver or a hardware scheduler to detect the end of execution of the process, the graphics processor further including a notification module to mark an end of a context associated with the process based on the response to the group page fault descriptor.

5. The system of claim 1, further including an input output memory management unit (IOMMU) having a page request queue and a page response queue, wherein the graphics processor further includes a first interface to place the group page fault descriptor into the page request queue to provide the group page fault descriptor to the page miss handler, and wherein the response module includes a second interface to retrieve the response from the page response queue to receive the response from the page miss handler.

6. The system of claim 1, wherein the descriptor module is to determine an address of a last memory access associated with the process, and incorporate the address into the group page fault descriptor.

7. An apparatus to manage page faults, comprising:
    a monitor to detect an end of execution of a process on a graphics processor;
    a descriptor module to provide a group page fault descriptor to a page miss handler of an operating system (OS) in response to a context switch, wherein the group page fault descriptor is to indicate to the page miss handler that no further page fault requests will be generated until one or more outstanding page fault requests are satisfied; and
    a response module to receive a response to the group page fault descriptor from the page miss handler, wherein the descriptor module and the response module are implemented at least partly in one or more of configurable logic or fixed-functionality logic hardware.

8. The apparatus of claim 7, wherein the descriptor module is to incorporate a process identifier into the group page fault descriptor, and wherein the process identifier is to be shared by the group page fault descriptor and the one or more outstanding page fault requests.

9. The apparatus of claim 7, wherein the monitor is to receive a process termination notification from the OS to detect the end of execution of the process, the apparatus further including a notification module to generate a notification of the end of execution of the process based on the response to the group page fault descriptor.

10. The apparatus of claim 7, wherein the monitor is to receive a context switch notification from one or more of a graphics driver or a hardware scheduler to detect the end of execution of the process, the apparatus further including a notification module to mark an end of a context associated with the process based on the response to the group page fault descriptor.

11. The apparatus of claim 7, further including a first interface to place the group page fault descriptor into a page request queue of an input output memory management unit (IOMMU) to provide the group page fault descriptor to the page miss handler, wherein the response module includes a second interface to retrieve the response from a page response queue of the IOMMU to receive the response from the page miss handler.

12. The apparatus of claim 7, wherein the descriptor module is to determine an address of a last memory access associated with the process, and incorporate the address into the group page fault descriptor.

13. A method of managing page faults, comprising:
    detecting an end of execution of a process on a graphics processor;
    providing a group page fault descriptor to a page miss handler of an operating system (OS) in response to a context switch, wherein the group page fault descriptor indicates to the page miss handler that no further page fault requests will be generated until one or more outstanding page fault requests are satisfied; and
    receiving a response to the group page fault descriptor from the page miss handler.

14. The method of claim 13, further including incorporating a process identifier into the group page fault descriptor, wherein the process identifier is shared by the group page fault descriptor and the one or more outstanding page fault requests.

15. The method of claim 13, wherein detecting the end of execution of the process includes receiving a process termination notification from the OS, the method further including generating a notification of the end of execution of the process based on the response to the group page fault descriptor.

16. The method of claim 13, wherein detecting the end of execution of the process includes receiving a context switch notification from one or more of a graphics driver or a hardware scheduler, the method further including marking an end of a context associated with the process based on the response to the group page fault descriptor.

17. The method of claim 13, wherein providing the group page fault descriptor to the page miss handler includes placing the group page fault descriptor into a page request queue of an input output memory management unit (IOMMU) and receiving the response from the page miss handler includes retrieving the response from a page response queue of the IOMMU.

18. The method of claim 13, further including:
    determining an address of a last memory access associated with the process; and
    incorporating the address into the group page fault descriptor.

19. At least one non-transitory computer readable storage medium comprising a set of instructions which, if executed by a computing device, cause the computing device to:
    detect an end of execution of a process on a graphics processor;
    provide a group page fault descriptor to a page miss handler of an operating system (OS) in response to a context switch, wherein the group page fault descriptor is to indicate to the page miss handler that no further page fault requests will be generated until one or more outstanding page fault requests are satisfied; and
    receive a response to the group page fault descriptor from the page miss handler.

20. The medium of claim 19, wherein the instructions, if executed, cause a computing device to incorporate a process identifier into the group page fault descriptor, wherein the process identifier is to be shared by the group page fault descriptor and the one or more outstanding page fault requests.

21. The medium of claim 19, wherein the instructions, if executed, cause a computing device to:
    receive a process termination notification from the OS to detect the end of execution of the process; and
    generate a notification of the end of execution of the process based on the response to the group page fault descriptor.

22. The medium of claim 19, wherein the instructions, if executed, cause a computing device to:
    receive a context switch notification from one or more of a graphics driver or a hardware scheduler to detect the end of execution of the process; and
    mark an end of a context associated with the process based on the response to the group page fault descriptor.

23. The medium of claim 19, wherein the instructions, if executed, cause a computing device to:
    place the group page fault descriptor into a page request queue of an input output memory management unit (IOMMU) to provide to the group page fault descriptor to the page miss handler; and
    retrieve the response from a page response queue of the IOMMU to receive the response from the page miss handler.

24. The medium of claim 19, wherein the instructions, if executed, cause a computing device to:
    determine an address of a last memory access associated with the process; and
    incorporate the address into the group page fault descriptor.

* * * * *